(12) United States Patent
Hannon (10) Patent No.: US 11,245,748 B1
(45) Date of Patent: Feb. 8, 2022

(54) PROXIED NODES IN A CONTAINER ORCHESTRATION ENVIRONMENT FOR SCALABLE RESOURCE ALLOCATION

(71) Applicant: International Business Machines Corporation, Armonk, NY (US)

(72) Inventor: Harold Hannon, Lewisville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/183,632

(22) Filed: Feb. 24, 2021

(51) Int. Cl.
*H04L 29/08* (2006.01)
*G06F 9/50* (2006.01)

(52) U.S. Cl.
CPC ............ *H04L 67/10* (2013.01); *G06F 9/5083* (2013.01); *H04L 67/28* (2013.01)

(58) Field of Classification Search
CPC ..... G06F 9/5083; G06F 9/50; H04L 41/0803; H04L 43/0817; H04L 67/10; H04L 67/28
See application file for complete search history.

(56) References Cited

U.S. PATENT DOCUMENTS

| | | | |
|---|---|---|---|
| 10,834,054 B2 | 11/2020 | Subbarayan et al. | |
| 2016/0182315 A1* | 6/2016 | Salokanto | H04L 41/5054 709/226 |
| 2018/0285250 A1* | 10/2018 | Helsley | G06F 11/34 |
| 2020/0412596 A1* | 12/2020 | Cherunni | G06F 9/5077 |
| 2021/0004389 A1* | 1/2021 | Shivashankara | G06F 40/20 |
| 2021/0026692 A1* | 1/2021 | Mestery | G06F 9/505 |
| 2021/0072966 A1* | 3/2021 | Zong | H04L 67/32 |
| 2021/0081247 A1* | 3/2021 | McBrearty | G06F 9/5033 |
| 2021/0089361 A1* | 3/2021 | Rafey | G06F 9/505 |
| 2021/0132974 A1* | 5/2021 | Watt, Jr. | G06F 9/45558 |
| 2021/0141655 A1* | 5/2021 | Gamage | G06F 9/4881 |
| 2021/0158083 A1* | 5/2021 | Gan | G06K 9/6223 |
| 2021/0194853 A1* | 6/2021 | Xiao | H04L 63/0281 |
| 2021/0194925 A1* | 6/2021 | Xiao | H04L 63/0227 |
| 2021/0240540 A1* | 8/2021 | Wang | G06F 9/5077 |
| 2021/0279111 A1* | 9/2021 | Ranjan | G06F 8/65 |

FOREIGN PATENT DOCUMENTS

CN     111522628 A     8/2020

OTHER PUBLICATIONS

Truyen et al., "Towards a container-based architecture for multi-tenant SaaS applications," Proceedings of the 15th International Workshop on Adaptive and Reflective Middleware (ARM), Dec. 2016, Trento, Italy, 6 pages.

* cited by examiner

Primary Examiner — Sargon N Nano
(74) Attorney, Agent, or Firm — Yee & Associates, P.C.

(57) ABSTRACT

Creating a multi-tenant model in a container orchestration environment where available host node resources are sharable among tenants is provided. A request to generate a plurality of pods to run a workload of a tenant in the multi-tenant model is received by a proxied node from a controller node in the container orchestration environment. In response to receiving the request to generate the plurality of pods, the plurality of pods to run the workload of the tenant is implemented by the proxied node using available resources from among multiple host nodes of a plurality of host nodes in the container orchestration environment registered to the proxied node.

20 Claims, 7 Drawing Sheets

PROXIED NODES IN A CONTAINER ORCHESTRATION ENVIRONMENT FOR SCALABLE RESOURCE ALLOCATION

BACKGROUND

1. Field

The disclosure relates generally to container orchestration environments and more specifically to providing proxied nodes in a container orchestration environment to enable scalable resource utilization across multiple host nodes in a plurality of host nodes for tenant resource availability requests in a multi-tenant model.

2. Description of the Related Art

A container orchestration environment, such as, for example, Kubernetes® (a registered trademark of the Linux Foundation of San Francisco, Calif.), provides a platform for automating deployment, scaling, and operations of application containers across clusters of host nodes. Many cloud services offer a container orchestration environment as a service (e.g., Platform-as-a-Service, Infrastructure-as-a-Service, or the like).

SUMMARY

According to one illustrative embodiment, a computer-implemented method for creating a multi-tenant model in a container orchestration environment where available host node resources are sharable among tenants is provided. A proxied node receives a request to generate a plurality of pods to run a workload of a tenant in the multi-tenant model from a controller node in the container orchestration environment. In response to receiving the request to generate the plurality of pods, the proxied node implements the plurality of pods to run the workload of the tenant using available resources from among multiple host nodes of a plurality of host nodes in the container orchestration environment registered to the proxied node. According to other illustrative embodiments, a computer system and computer program product for creating a multi-tenant model in a container orchestration environment where available host node resources are sharable among tenants are provided.

DETAILED DESCRIPTION

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

Figure 1:
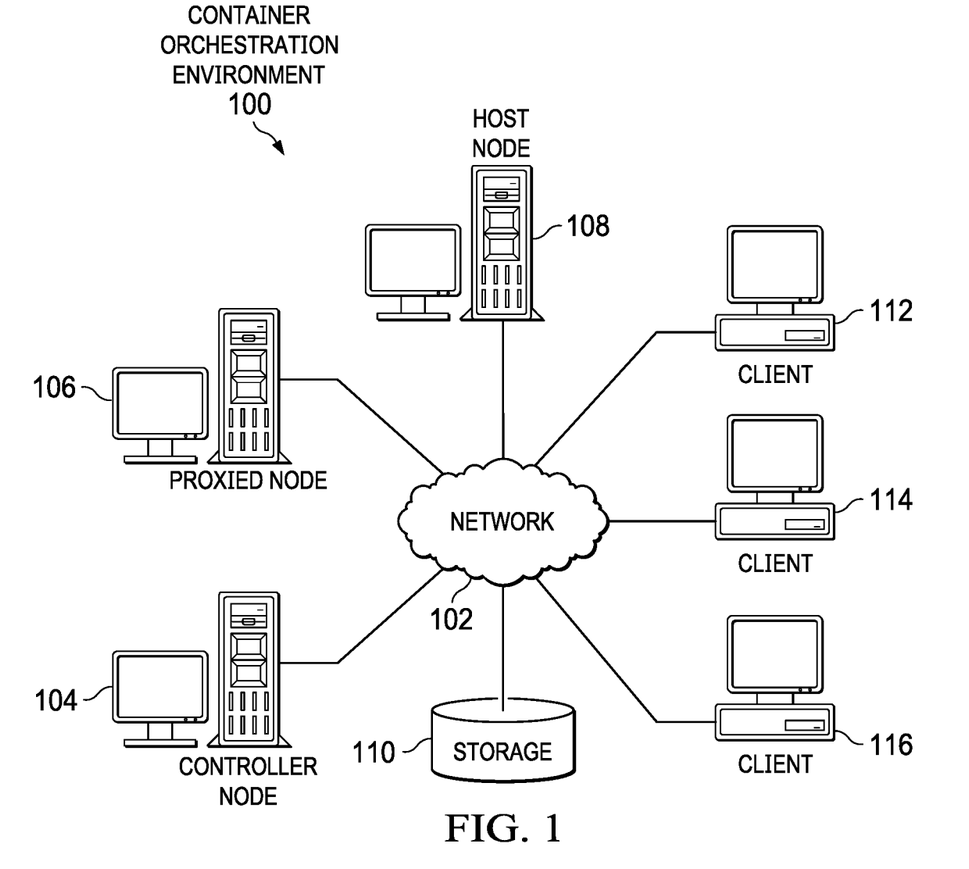
FIG. 1 is a pictorial representation of a container orchestration environment in which illustrative embodiments may be implemented.

FIG. 1 depicts a pictorial representation of a container orchestration environment in which illustrative embodiments may be implemented. Container orchestration environment 100 is a network of computers, data processing systems, and other devices in which the illustrative embodiments may be implemented. Container orchestration environment 100 contains network 102, which is the medium used to provide communications links between the computers, data processing systems, and other devices connected together within container orchestration environment 100. Network 102 may include connections, such as, for example, wire communication links, wireless communication links, fiber optic cables, and the like.

In the depicted example, container orchestration environment 100 includes controller node 104, proxied node 106, and host node 108, which connect to network 102, along with storage 110. Controller node 104, proxied node 106, and host node 108 may be, for example, server computers with high-speed connections to network 102. In addition, controller node 104, proxied node 106, and host node 108 may each represent a cluster of servers in one or more data centers. Alternatively, controller node 104, proxied node 106, and host node 108 may each represent multiple computing nodes in one or more cloud environments. Further, controller node 104, proxied node 106, and host node 108 may each include a set of virtual machines. Container orchestration environment 100 provides automatic deployment, scaling, and operations of pods, each pod comprising one or more containers, for running tenant workloads across clusters of host nodes.

Controller node 104 receives and tracks tenant resource availability requests from tenants requesting performance of tenant workloads. In addition, controller node 104 corresponds to a cluster of host nodes, which is represented by host node 108, that performs tenant workloads. Controller node 104 controls the cluster of host nodes represented by host node 108 via proxied node 106. Proxied node 106 is an interface between controller node 104 and container runtimes of the cluster of host nodes represented by host node 108.

Proxied node 106 receives the tenant resource availability requests from controller node 104. In response to receiving a resource availability request of a particular tenant to perform a workload from controller node 104, proxied node 106 scans the cluster of host nodes represented by host node 108 to identify aggregate resource availability across the cluster of host nodes. Based on the scan, and pod specifications corresponding to the workload received from controller node 104, proxied node 106 identifies a set of host nodes in the cluster that provides the most efficient or optimal use of available resources to perform the workload of that particular tenant. Afterward, proxied node 106 schedules and places a plurality of pods on the identified set of host nodes in the cluster to run the workload of that particular tenant. Proxied node 106 also sends health status of containers in each of the plurality of pods while running the tenant workload to controller node 104.

Client 112, client 114, and client 116 also connect to network 102. Clients 112, 114, and 116 are clients of host node 108. Further, clients 112, 114, and 116 may each represent a plurality of client devices. In this example, clients 112, 114, and 116 are shown as desktop or personal computers with wire communication links to network 102. However, it should be noted that clients 112, 114, and 116 are examples only and may represent other types of data processing systems, such as, for example, network computers, laptop computers, handheld computers, smart phones, smart televisions, smart vehicles, gaming devices, and the like, with wire or wireless communication links to network 102.

Clients 112, 114, and 116 correspond to tenants, such as, for example, users or customers, in a multi-tenant model in container orchestration environment 100. Tenants corresponding to clients 112, 114, and 116 may utilize clients 112, 114, and 116 to request performance of tenant workloads by the cluster of host nodes represented by host node 108. A tenant workload may be any type of workload, such as, for example, data processing, image processing, transaction processing, sensor monitoring, scientific calculations, forecasts, predictions, or the like.

Storage 110 is a network storage device capable of storing any type of data in a structured format or an unstructured format. In addition, storage 110 may represent a plurality of network storage devices. Further, storage 110 may store information, such as, for example, enterprise data, transactional data, scientific equations, sensor data, video data, and the like, that is needed to perform particular tenant workloads. Furthermore, storage 110 may store data generated by container runtimes of the cluster of host nodes represented by host node 108. Moreover, storage 110 may store other types of data, such as authentication or credential data that may include usernames, passwords, and the like associated with tenants and system administrators, for example.

In addition, it should be noted that container orchestration environment 100 may include any number of additional computer nodes, client devices, storage devices, and other devices not shown. Program code located in container orchestration environment 100 may be stored on a computer-readable storage medium or a set of computer-readable storage media and downloaded to a computer or other data processing device for use. For example, program code may be stored on a computer-readable storage medium on host node 108 and downloaded to client 112 over network 102 for use on client 112.

In the depicted example, container orchestration environment 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category. For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
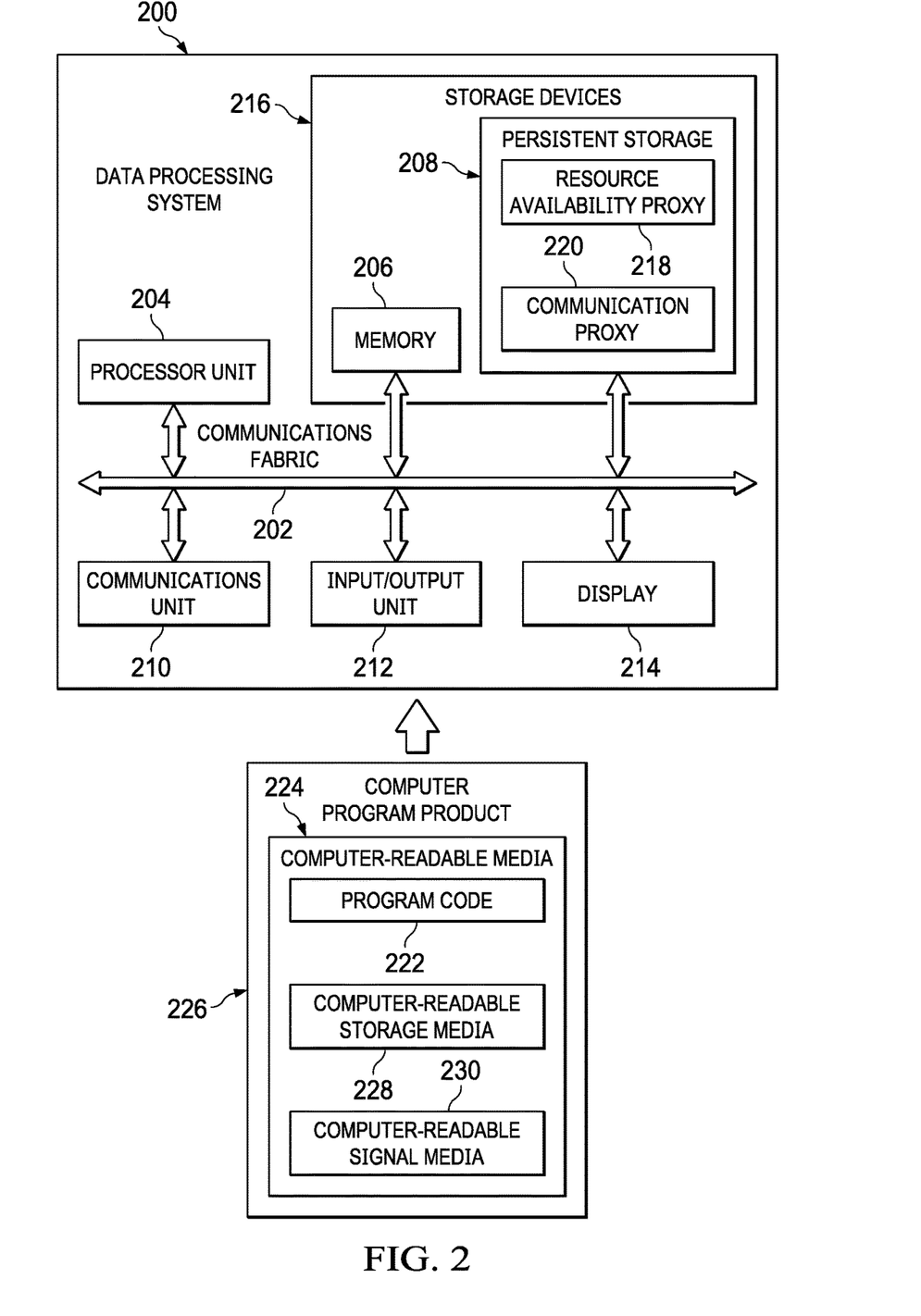
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as proxied node 106 in FIG. 1, in which computer-readable program code or instructions implementing the scalable resource allocation processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores resource availability proxy 218 and communication proxy 220. However, it should be noted that even though resource availability proxy 218 and communication proxy 220 are illustrated as residing in persistent storage 208, in an alternative illustrative embodiment, resource availability proxy 218 and communication proxy 220 may be a separate components of data processing system 200. For example, resource availability proxy 218 and communication proxy 220 may be hardware components coupled to communication fabric 202 or a combination of hardware and software components. In another alternative illustrative embodiment, resource availability proxy 218 and communication proxy 220 may be combined into one component. Further, it should be noted that resource availability proxy 218 and communication proxy 220 are not collocated with any of the container runtimes of host nodes in the cluster and serve as primary interfaces between the host nodes in the cluster and a corresponding controller node, such as, for example, controller node 104 in FIG. 1.

Resource availability proxy 218 receives resource availability requests of tenants from the corresponding controller node, along with pod specifications corresponding to respective tenant workloads associated with the resource availability requests. Resource availability proxy 218 ensures that containers, which are described in the pod specifications, corresponding to respective tenant workloads are running and healthy. Resource availability proxy 218 utilizes, for example, remote procedure calls to cause execution of respective tenant workloads across the cluster of host nodes. Communication proxy 220 controls routing of network traffic to and from respective containers included in the pods running tenant workloads across the cluster of host nodes. In other words, communication proxy 220 provides communication between a particular tenant and the pods that are running a corresponding workload of that particular.

As a result, data processing system 200 operates as a special purpose computer system in which resource availability proxy 218 and communication proxy 220 in data processing system 200 enable scalable resource allocation by scheduling and placing pods to run tenant workloads on particular different sets of host nodes in the cluster providing efficient utilization of available resources in the cluster based on pod specifications corresponding to each of the different tenant workloads. In particular, resource availability proxy 218 and communication proxy 220 transform data processing system 200 into a special purpose computer system as compared to currently available general computer systems that do not have resource availability proxy 218 and communication proxy 220.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 222 is located in a functional form on computer-readable media 224 that is selectively removable and may be loaded onto or transferred to data processing system 200 for running by processor unit 204. Program code 222 and computer-readable media 224 form computer program product 226. In one example, computer-readable media 224 may be computer-readable storage media 228 or computer-readable signal media 230.

In these illustrative examples, computer-readable storage media 228 is a physical or tangible storage device used to store program code 222 rather than a medium that propagates or transmits program code 222. Computer-readable storage media 228 may include, for example, an optical or magnetic disc that is inserted or placed into a drive or other device that is part of persistent storage 208 for transfer onto a storage device, such as a hard drive, that is part of persistent storage 208. Computer-readable storage media 228 also may take the form of a persistent storage, such as a hard drive, a thumb drive, or a flash memory that is connected to data processing system 200.

Alternatively, program code 222 may be transferred to data processing system 200 using computer-readable signal media 230. Computer-readable signal media 230 may be, for example, a propagated data signal containing program code 222. For example, computer-readable signal media 230 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 224" can be singular or plural. For example, program code 222 can be located in computer-readable media 224 in the form of a single storage device or system. In another example, program code 222 can be located in computer-readable media 224 that is distributed in multiple data processing systems. In other words, some instructions in program code 222 can be located in one data processing system while other instructions in program code 222 can be located in one or more other data processing systems. For example, a portion of program code 222 can be located in computer-readable media 224 in one server computer while another portion of program code 222 can be located in computer-readable media 224 located in a set of server computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 222.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

A container orchestration environment includes a controller node, which is a main controlling unit of a cluster host nodes (also known as worker nodes or minions), managing the cluster's workload and directing communication across the cluster. The control plane of a controller node consists of various components, such as a data store, application programming interface (API) server, scheduler, and controller. The data store contains configuration data of the cluster, representing the overall state of the cluster at any given time. The API server provides internal and external interfaces for the controller node. The API server processes and validates resource availability requests and updates state of API objects in the data store, thereby allowing tenants (e.g., users, clients, customers, or the like) to configure workloads and containers across host nodes in the cluster. The scheduler selects which host node an unscheduled pod runs on, based on resource availability of respective host nodes. A pod is the basic unit managed by the scheduler. The scheduler tracks resource utilization on each host node to ensure that workload is not scheduled in excess of available resources. The controller is a reconciliation loop that drives actual cluster state toward the desired cluster state, communicating with the API server to create, update, and delete the resources the controller manages (e.g., pods, service endpoints, and the like).

A host node is a machine, either physical or virtual, where containers (i.e., application workloads) are deployed. A pod consists of one or more containers that are co-located on the same host node. The host node hosts the pods that are the components of the application workloads. In a Kubernetes environment, a host node comprises a kubelet, kube-proxy, and container runtime. The kubelet is an agent that runs on each host node and is responsible for the running state of each host node, ensuring that all containers on a host node are running and healthy. The kubelet starts, stops, and maintains containers organized into pods as directed by the control plane of the controller node. The kube-proxy is responsible for routing network traffic to the appropriate container based on Internet Protocol address of a given container that was included in a request. The container runtime holds the running application, libraries, and their dependencies of a service.

In the course of developing illustrative embodiments, some solutions for resource scheduling in a container orchestration environment (e.g., a Kubernetes environment) were discovered that depend on single host-bound contexts. In other words, these solutions are serviceable for a single-tenant model only. However, once these particular solutions are applied to a provider of cloud resources, these solutions allow for wasted resources in the form of hypervisor overhead (e.g., many hosts are generated as virtual machines on physical machines) or unused host resources (e.g., host is used entirely for one tenant and any unused resources of that host are wasted).

In some situations, container runtime proxies focus on abstracting the runtimes of containers to be scheduled and managed by the container orchestration environment. However, such container runtime proxies may only focus on allowing different implementations of containers and not on host resource allocation and utilization. An issue with such container runtime proxies is that these container runtime proxies assume that a container will always be scheduled on the host that a container runtime proxy resides on and do not allow for the scheduling of resources across multiple host nodes presented as a single host node to the container orchestration environment. Scheduling resources across multiple host nodes presented as a single host node to the container orchestration environment would allow for nearly unlimited (i.e., based on provider capacity) resource availability to a tenant and would no longer be limited to just the resources available on a single local host, nor would a hypervisor be required to generate virtual host nodes.

Illustrative embodiments are capable of capturing tenant requests for resource availability and applying these tenant resource availability requests to many host nodes within a cluster rather than to only a local host node. Illustrative embodiments utilize a new implementation (i.e., a proxied node) to receive tenant resource availability requests from a corresponding controller node in the cluster. It should be noted that, in some embodiments, the proxied node, which includes a resource availability proxy and a communication proxy and not a container runtime, is separate from a host node, which includes the container runtime. After receiving a tenant resource availability request, the proxied node then searches multiple host nodes, which are registered with and connected to the proxied node, for resource availability and returns aggregate resource availability information corresponding to the multiple host nodes to the controller node rather than sending only resource availability of a single local host node to the controller node.

In some embodiments, if the scheduler of the controller node elects to allow the proxied node to schedule and place pods on host nodes within the cluster, then the proxied node receives a request to generate pods across several of the registered host nodes to perform a tenant workload from the corresponding controller node. After receiving the request, the proxied node selects the most efficient resource utilization of the registered host nodes in the cluster to run the pods to perform the tenant workload. The proxied node may take into account a plurality of different factors, such as, for example, tenant behavior (i.e., historic utilization of resources, such as processor, memory, storage, network, and the like, over time by the tenant with regard to previous resource availability requests), service level agreement corresponding to the tenant, workload type of the tenant, and the like, when determining the optimal or most efficient use of the cluster's available resources to run the pods. The proxied node then implements the optimal host resource allocation and utilization to the received resource availability request from the tenant.

In some embodiments, the proxied node may include a well-defined set of application programming interfaces (APIs), which the proxied node utilizes to interact with the corresponding controller node of the cluster. The controller node tracks resource availability on each respective host node in the cluster based on the proxied node reporting maximum resource availability of host nodes in the cluster until underlying resources of the registered host nodes are diminished. This maximum host resource availability information provides the proxied node with a pool of resources corresponding to multiple host nodes instead of just resources of a single host node. The proxied node keeps the current state of each respective host node, which is registered with and connected to the proxied node, and sends the aggregated resource availability information back to the corresponding controller node.

In some embodiments, once the controller node selects pod scheduling to the proxied node, which represents a pool of host nodes (i.e., host nodes registered with the proxied node), the proxied node utilizes pod specifications and the plurality of different factors to determine the optimal location within the cluster of host nodes to schedule and place the plurality of pods to perform the tenant workload. As a result, illustrative embodiments can now apply the pod scheduling of the proxied node to current models for providers of cloud virtualization as if the controller node were scheduling directly to host nodes.

Furthermore, illustrative embodiments enable multiple proxied nodes to share available resources of the same set of pooled host nodes. For example, each respective proxied node in the group of proxied nodes simply tracks the state of available resources across the entire pool of host nodes and accounts for resource utilization by other proxied nodes in the group. This effectively injects a multi-tenant model into the current single-tenant model of container orchestration environments. Being able to collocate multiple tenants on a cluster of host nodes shared between multiple controller nodes of a container orchestration environment provides for efficient utilization of available resources in packing algorithms for host nodes, while presenting scalable resource availability to each tenant across the entire pool of host nodes. A packing algorithm packs tenants onto one host node or spreads tenants out among host nodes depending on resource needs of each respective tenant workload.

Thus, illustrative embodiments provide one or more technical solutions that overcome a technical problem with scaling resource allocation to multiple tenants in a container orchestration environment. As a result, these one or more technical solutions provide a technical effect and practical application in the field of resource allocation and utilization in a container orchestration environment.

Figure 3:
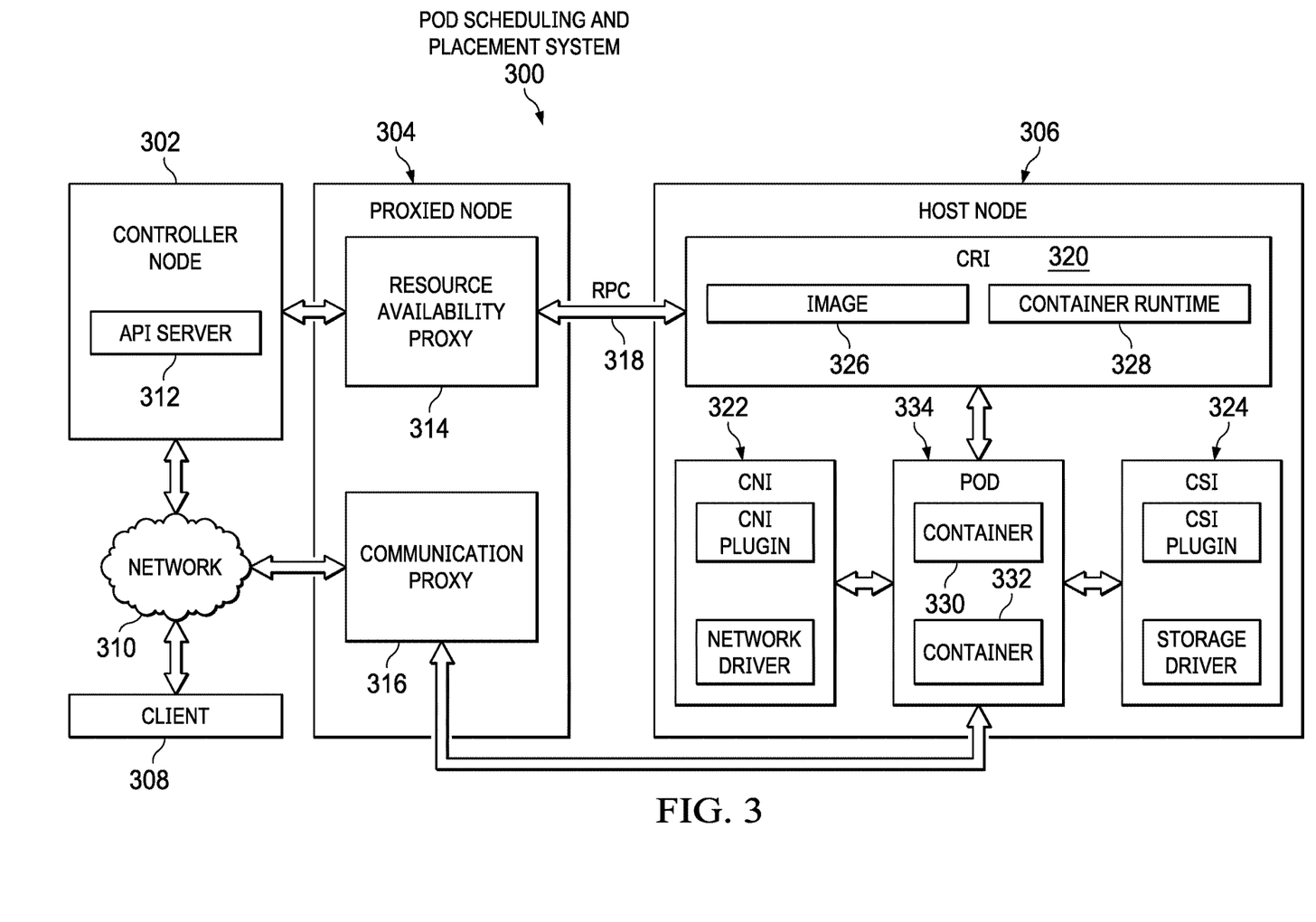
FIG. 3 is a diagram illustrating an example of a pod scheduling and placement system in accordance with an illustrative embodiment.

With reference now to FIG. 3, a diagram illustrating an example of a pod scheduling and placement system is depicted in accordance with an illustrative embodiment. Pod scheduling and placement system 300 may be implemented in a container orchestration environment, such as container orchestration environment 100 in FIG. 1. Pod scheduling and placement system 300 is a system of hardware and software components for scheduling and placing pods across multiple host nodes in a cluster based on pod specifications corresponding to a tenant workload to efficiently utilize available resources of the cluster while performing the tenant workload.

In this example, Pod scheduling and placement system 300 includes controller node 302, proxied node 304, host node 306, client 308, and network 310. However, it should be noted that Pod scheduling and placement system 300 is intended as an example only and not as a limitation on illustrative embodiments. In other words, Pod scheduling and placement system 300 may include any number of controller nodes, proxied nodes, host nodes, clients, networks, and other components not shown.

Controller node 302 may be, for example, controller node 104 in FIG. 1. Controller node 302 controls and manages host nodes, such as host node 306, in a corresponding cluster via proxied node 304. In this example, controller node 302 includes application programming interface (API) server 312. Controller node 302 utilizes API server 312 to receive, process, and validate resource availability requests from registered tenants. For example, controller node 302 utilizes API server 312 to receive a resource availability request regarding a workload from a tenant corresponding to client 308 via network 310. Client 308 and network 310 may be, for example, client 112 and network 102 in FIG. 1.

After processing and validating the resource availability request of the tenant regarding the workload, API server 312 sends the tenant resource availability request to proxied node 304, along with pod specifications corresponding to the tenant workload. Proxied node 304 may be, for example, proxied node 106 in FIG. 1 or data processing system 200 in FIG. 2. In this example, proxied node 304 includes resource availability proxy 314 and communication proxy 316, such as, for example, resource availability proxy 218 and communication proxy 220 in FIG. 2.

Proxied node 304 utilizes resource availability proxy 314 to receive the tenant resource availability request and pod specifications corresponding to the tenant workload. After receiving the tenant resource availability request and pod specifications corresponding to the tenant workload, resource availability proxy 314 searches host nodes, such as host node 306, in the cluster for available resources to perform the tenant workload. At 318, after determining the most efficient or optimal utilization of available resources across a set of host nodes in the cluster using a plurality of different factors and information in the pod specifications, resource availability proxy 314 utilizes remote procedure calls to cause execution of the tenant workload across the set of host nodes in the cluster, which includes host node 306. It should be noted that host node 306 is representative of each respective host node in the set of host nodes that will perform the tenant workload.

In this example, host node 306 includes container runtime interface (CRI) 320, container network interface (CNI) 322, and container storage interface (CSI) 324. CRI 320 comprises image 326 and container runtime 328. Image 326 may be, for example, a Docker® image for running container runtime 328. Docker is a registered trademark of Docker, Inc., Palo Alto, Calif. Container runtime 328 starts and stops containers, such as container 330 and container 332 located in pod 334, which run the tenant workload. A container runtime is the lowest level of a service, which holds the running application, libraries, and their dependencies. CNI 322 configures network interfaces for containers 330 and 332. CSI 324 configures storage interfaces for containers 330 and 332. In addition, CSI 324 manages storage blocks and allocation to container runtime 328. Proxied node 304 utilizes CRI 320, CNI 322, and CSI 324 to generate pod instances, such as pod 334.

Proxied node 304 utilizes resource availability proxy 314 to monitor the health status of containers 330 and 332 of pod 334 while running the tenant workload. In addition, proxied node 304 utilizes communication proxy 316 to control routing of network traffic to and from containers 330 and 332.

Figure 4:
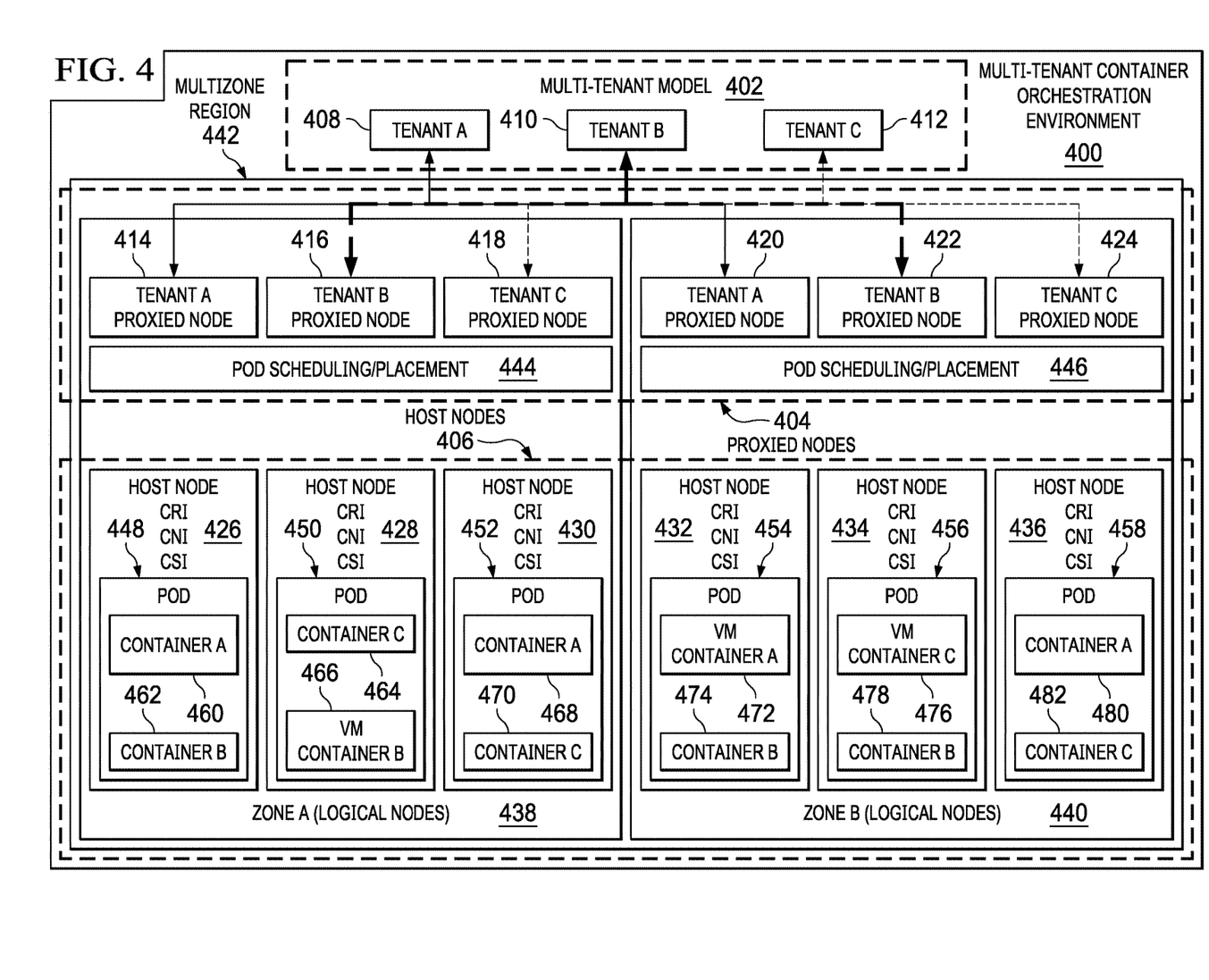
FIG. 4 is a diagram illustrating an example of a multi-tenant container orchestration environment in accordance with an illustrative embodiment.

With reference now to FIG. 4, a diagram illustrating an example of a multi-tenant container orchestration environment is depicted in accordance with an illustrative embodiment. Multi-tenant container orchestration environment 400 may be implemented in, for example, container orchestration environment 100 in FIG. 1 or pod scheduling and placement system 300 in FIG. 3.

In this example, multi-tenant container orchestration environment 400 includes multi-tenant model 402, proxied nodes 404, and host nodes 406. Multi-tenant model 402 includes tenant A 408, tenant B 410, and tenant C 412. Proxied nodes 404 include tenant A proxied node 414, tenant B proxied node 416, tenant C proxied node 418, tenant A proxied node 420, tenant B proxied node 422, and tenant C proxied node 424. Host nodes 406 include host node 426, host node 428, host node 430, host node 432, host node 434, and host node 436. However, it should be noted that multi-tenant container orchestration environment 400 is intended as an example only and not as a limitation on illustrative embodiments. In other words, multi-tenant container orchestration environment 400 may include any number of tenants, proxied nodes, host nodes, and other components not shown.

Tenant A 408, tenant B 410, and tenant C 412 correspond to client devices, such as, for example, client 112, client 114, and client 116 in FIG. 1. Tenant A 408, tenant B 410, and tenant C 412 connect to a corresponding proxied node of proxied nodes 404 via a network, such as, for example, network 102 in FIG. 1 or network 310 in FIG. 3.

In this example, tenant A proxied node 414, tenant B proxied node 416, and tenant C proxied node 418 are logical nodes located in zone A 438 and tenant A proxied node 420, tenant B proxied node 422, and tenant C proxied node 424 are logical nodes in zone B 440 of multizone region 442. Tenant A 408 corresponds to tenant A proxied node 414 in zone A 438 and tenant A proxied node 420 in zone B 440. Tenant B 410 corresponds to tenant B proxied node 416 in zone A 438 and tenant B proxied node 422 in zone B 440. Tenant C 412 corresponds to tenant C proxied node 418 in zone A 438 and tenant C proxied node 424 in zone B 440.

Tenant A proxied node 414, tenant B proxied node 416, and tenant C proxied node 418 perform pod scheduling and placement 444 across host node 426, host node 428, and host node 430 to efficiently utilize available resources of host node 426, host node 428, and host node 430 to run workloads corresponding to tenant A 408, tenant B 410, and tenant C 412 in zone A 438. Similarly, tenant A proxied node 420, tenant B proxied node 422, and tenant C proxied node 424 perform pod scheduling and placement 446 across host node 432, host node 434, and host node 436 to efficiently utilize available resources of host node 432, host node 434, and host node 436 to run workloads corresponding to tenant A 408, tenant B 410, and tenant C 412 in zone B 440.

In this example, pod scheduling and placement 444 schedules and places (i.e., generates) pod 448 on host node 426, pod 450 on host node 428, and pod 452 on host node 430 using a CRI, CNI, and CSI of each respective host node. Similarly, pod scheduling and placement 446 schedules and places pod 454 on host node 432, pod 456 on host node 434, and pod 458 on host node 436 using a CRI, CNI, and CSI of each respective host node. However, it should be noted that a given host node may include more than one pod.

Also, in this example, pod 448 contains container A 460 and container B 462; pod 450 contains container C 464 and virtual machine (VM) container B 466; pod 452 contains container A 468 and container C 470; pod 454 contains VM container A 472 and container B 474; pod 456 contains VM container C 476 and container B 478; and pod 458 contains container A 480 and container C 482. However, it should be noted that a given pod may include any number of containers, such as, for example, one, two, three, four, or more containers.

In addition, it should be noted that in this example available host node resources are not shared between zone A 438 and zone B 440 to perform tenant workloads. However, in an alternative illustrative embodiment, available host node resources may be shared between different zones in a multizone region.

Figure 5A:
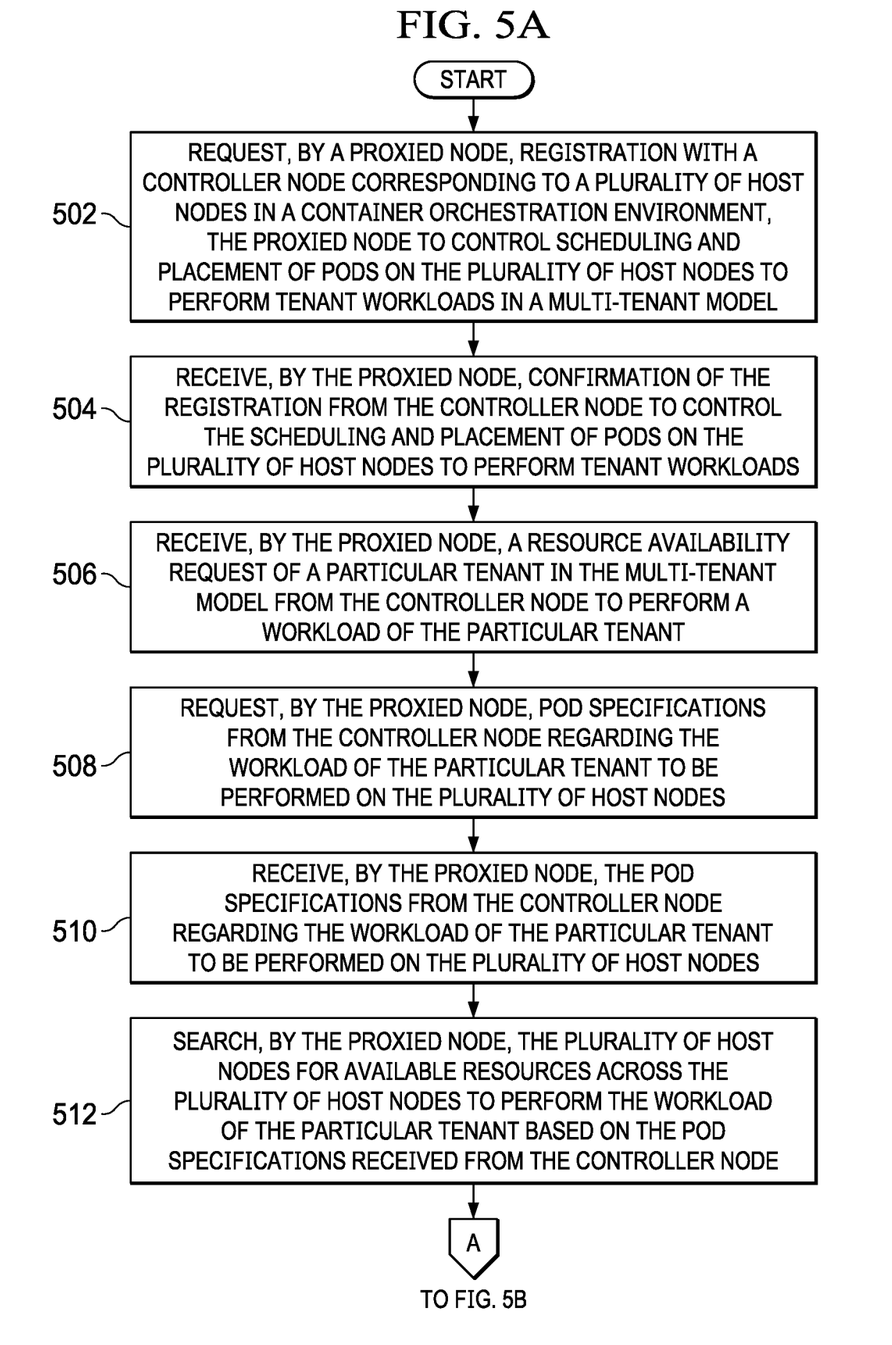
FIGS. 5A-5B are a flowchart illustrating a process for a proxied node in accordance with an illustrative embodiment.
Figure 5B:
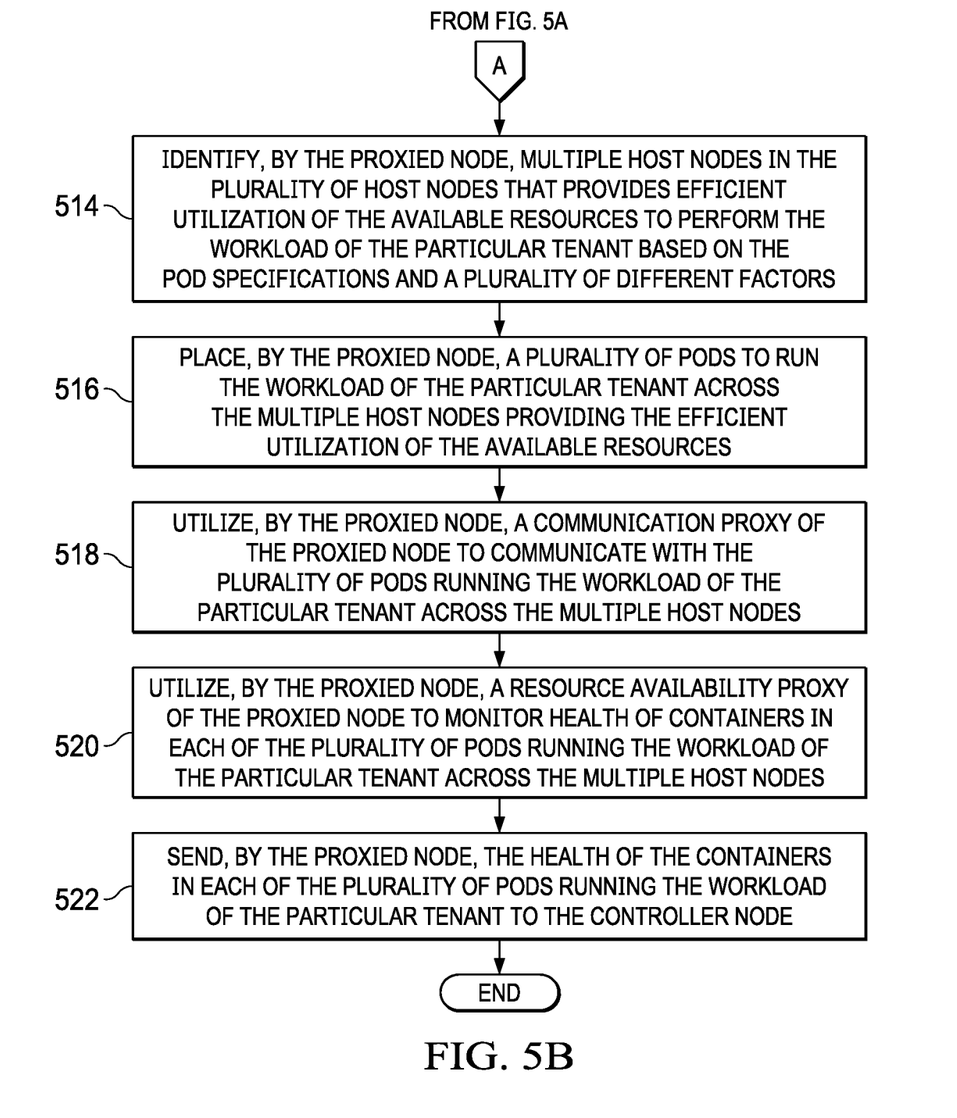

With reference now to FIGS. 5A-5B, a flowchart illustrating a process for a proxied node is shown in accordance with an illustrative embodiment. The process shown in FIGS. 5A-5B may be implemented in a proxied node (i.e., computer), such as, for example, proxied node 106 in FIG. 1 or data processing system 200 in FIG. 2.

The process begins when the proxied node requests registration with a controller node corresponding to a plurality (e.g., cluster) of host nodes in a container orchestration environment (step 502). The proxied node is to control scheduling and placement of pods on the plurality of host nodes to perform tenant workloads in a multi-tenant model. In response to requesting the registration, the proxied node receives confirmation of the registration from the controller node to control the scheduling and placement of pods on the plurality of host nodes to perform tenant workloads (step 504).

In addition, the proxied node receives a resource availability request of a particular tenant in the multi-tenant model from the controller node to perform a workload of the particular tenant (step 506). In response to receiving the resource availability request of the particular tenant, the proxied node requests pod specifications from the controller node regarding the workload of the particular tenant to be performed on the plurality of host nodes (step 508). Afterward, the proxied node receives the pod specifications from the controller node regarding the workload of the particular tenant to be performed on the plurality of host nodes (step 510).

The proxied node searches the plurality of host nodes for available resources across the plurality of host nodes to perform the workload of the particular tenant based on the pod specifications received from the controller node (step 512). The proxied node identifies multiple host nodes in the plurality of host nodes that provide efficient utilization of the available resources to perform the workload of the particular tenant based on the pod specifications and a plurality of different factors (step 514). The plurality of different factors includes, for example, historic behavior of the particular tenant regarding resource utilization, service level agreement corresponding to the particular tenant, workload type of the particular tenant, and the like. The proxied node places a plurality of pods to run the workload of the particular tenant across the multiple host nodes providing the efficient utilization of the available resources (step 516).

Further, the proxied node utilizes a communication proxy of the proxied node to communicate with the plurality of pods running the workload of the particular tenant across the multiple host nodes (step 518). Furthermore, the proxied node utilizes a resource availability proxy of the proxied node to monitor health of containers in each of the plurality of pods running the workload of the particular tenant across the multiple host nodes (step 520). Moreover, the proxied node sends the health of the containers in each of the plurality of pods running the workload of the particular tenant to the controller node (step 522). Thereafter, the process terminates.

Figure 6:
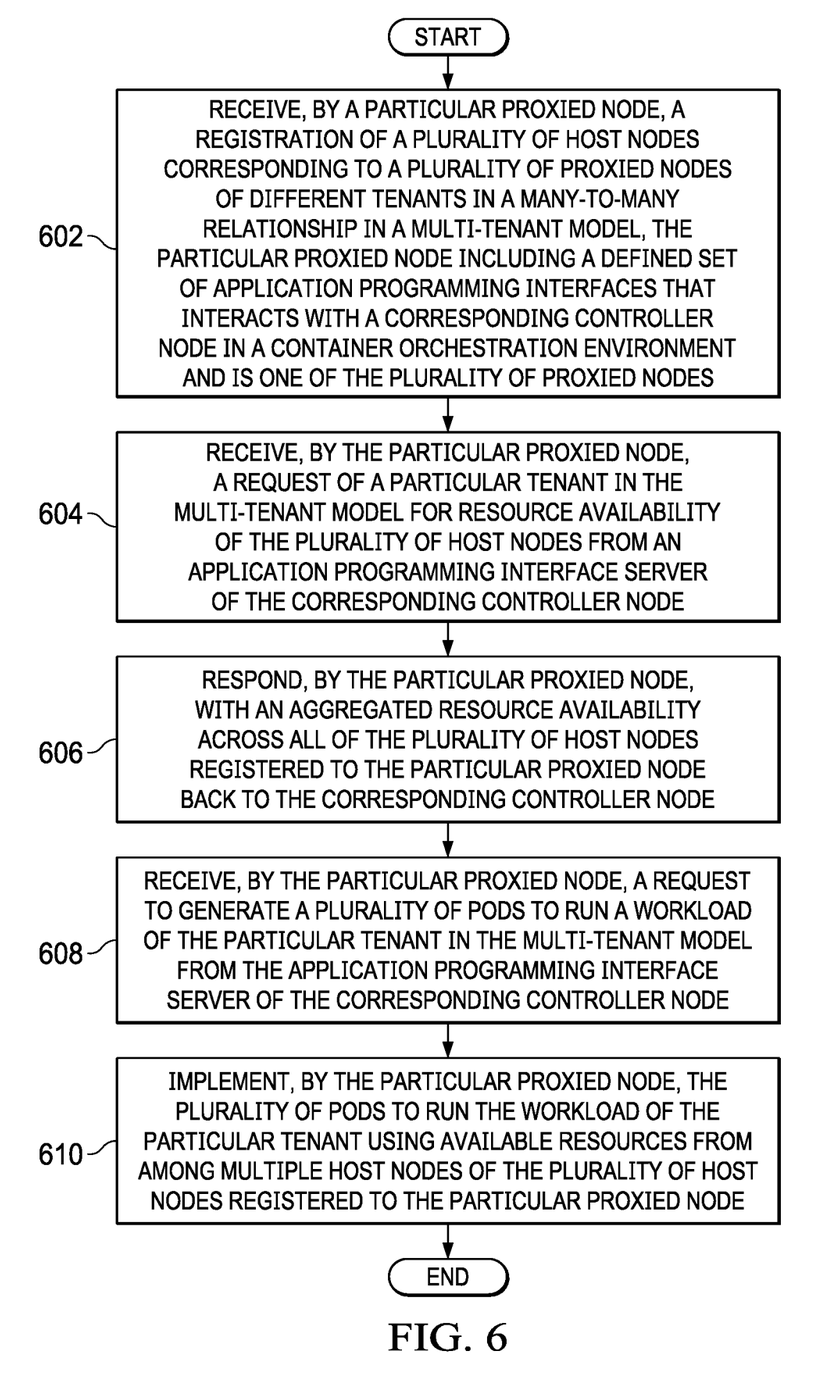
FIG. 6 is a flowchart illustrating a process for creating a multi-tenant model in a container orchestration environment where available host node resources are sharable among tenants in accordance with an illustrative embodiment.

With reference now to FIG. 6, a flowchart illustrating a process for creating a multi-tenant model in a container orchestration environment where available host node resources are sharable among tenants is shown in accordance with an illustrative embodiment. The process shown in FIG. 6 may be implemented in a proxied node, such as, for example, proxied node 106 in FIG. 1 or data processing system 200 in FIG. 2.

The process begins when the proxied node receives a registration of a plurality of host nodes corresponding to a plurality of proxied nodes of different tenants in a many-to-many relationship in the multi-tenant model (step 602). The particular proxied node includes a defined set of application programming interfaces that interacts with a corresponding controller node in the container orchestration environment and the particular proxied node is one of the plurality of proxied nodes. In addition, the particular proxied node receives a request of a particular tenant in the multi-tenant model for resource availability of the plurality of host nodes from an application programming interface server of the corresponding controller node (step 604).

Afterward, the particular proxied node responds with an aggregated resource availability across all of the plurality of host nodes registered to the particular proxied node back to the corresponding controller node (step 606). Subsequently, the particular proxied node receives a request to generate a plurality of pods to run a workload of the particular tenant in the multi-tenant model from the application programming interface server of the corresponding controller node (step 608). In response to receiving the request to generate the plurality of pods, the particular proxied node implements the plurality of pods to run the workload of the particular tenant using available resources from among multiple host nodes of the plurality of host nodes registered to the particular proxied node (step 610). Thereafter, the process terminates.

Thus, illustrative embodiments of the present invention provide a computer-implemented method, computer system, and computer program product for providing proxied nodes in a container orchestration environment to enable scalable resource utilization across multiple host nodes in a plurality of host nodes for tenant resource availability requests in a multi-tenant model. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for creating a multi-tenant model in a container orchestration environment where available host node resources are sharable among tenants, the computer-implemented method comprising:

receiving, by a proxied node, a request to generate a plurality of pods to run a workload of a tenant in the multi-tenant model from a controller node in the container orchestration environment; and responsive to receiving the request to generate the plurality of pods, implementing, by the proxied node, the plurality of pods to run the workload of the tenant using available resources from among multiple host nodes of a plurality of host nodes in the container orchestration environment registered to the proxied node.

2. The computer-implemented method of claim 1 further comprising:

receiving, by the proxied node, a registration of the plurality of host nodes corresponding to a plurality of proxied nodes of different tenants in a many-to-many relationship in the multi-tenant model, wherein the proxied node includes a defined set of application programming interfaces that interacts with the controller node in the container orchestration environment and is one of the plurality of proxied nodes;

receiving, by the proxied node, a request of the tenant in the multi-tenant model for resource availability of the plurality of host nodes from the controller node; and responding, by the proxied node, with an aggregated resource availability across the plurality of host nodes registered to the proxied node back to the controller node.

3. The computer-implemented method of claim 1 further comprising:

requesting, by the proxied node, registration with the controller node corresponding to the plurality of host nodes in the container orchestration environment, wherein the proxied node controls scheduling and placement of pods on the plurality of host nodes to perform tenant workloads in the multi-tenant model; and receiving, by the proxied node, confirmation of the registration from the controller node to control the scheduling and placement of pods on the plurality of host nodes to perform tenant workloads.

4. The computer-implemented method of claim 1 further comprising:

receiving, by the proxied node, a resource availability request of the tenant in the multi-tenant model from the controller node to perform the workload of the tenant;

requesting, by the proxied node, pod specifications from the controller node regarding the workload of the tenant to be performed on the plurality of host nodes; and receiving, by the proxied node, the pod specifications from the controller node regarding the workload of the tenant to be performed on the plurality of host nodes.

5. The computer-implemented method of claim 1 further comprising:

searching, by the proxied node, the plurality of host nodes for available resources across the plurality of host nodes to perform the workload of the tenant based on pod specifications received from the controller node;

identifying, by the proxied node, the multiple host nodes in the plurality of host nodes that provides efficient utilization of the available resources to perform the workload of the tenant based on the pod specifications and a plurality of factors, wherein the plurality of factors include historic behavior of the tenant regarding resource utilization, service level agreement corresponding to the tenant, and workload type of the tenant; and placing, by the proxied node, the plurality of pods to run the workload of the tenant across the multiple host nodes providing the efficient utilization of the available resources.

6. The computer-implemented method of claim 1 further comprising:

utilizing, by the proxied node, a communication proxy of the proxied node to communicate with the plurality of pods running the workload of the tenant across the multiple host nodes.

7. The computer-implemented method of claim 1 further comprising:

utilizing, by the proxied node, a resource availability proxy of the proxied node to monitor health of containers in each of the plurality of pods running the workload of the tenant across the multiple host nodes; and sending, by the proxied node, the health of the containers in each of the plurality of pods running the workload of the tenant to the controller node.

8. The computer-implemented method of claim 7, wherein the resource availability proxy utilizes remote procedure calls to cause execution of the workload of the tenant across the multiple host nodes in the plurality of host nodes.

9. The computer-implemented method of claim 1, wherein the proxied node is an interface between the controller node and container runtimes of the plurality of host nodes.

10. A computer system for creating a multi-tenant model in a container orchestration environment where available host node resources are sharable among tenants, the computer system comprising:
a bus system;
a storage device connected to the bus system, wherein the storage device stores program instructions; and
a processor connected to the bus system, wherein the processor executes the program instructions to:
receive a request to generate a plurality of pods to run a workload of a tenant in the multi-tenant model from a controller node in the container orchestration environment; and
implement the plurality of pods to run the workload of the tenant using available resources from among multiple host nodes of a plurality of host nodes in the container orchestration environment registered to the computer system in response to receiving the request to generate the plurality of pods.

11. The computer system of claim 10, wherein the processor further executes the program instructions to:
receive a registration of the plurality of host nodes corresponding to a plurality of proxied nodes of different tenants in a many-to-many relationship in the multi-tenant model, wherein the computer system includes a defined set of application programming interfaces that interacts with the controller node in the container orchestration environment and is one of the plurality of proxied nodes;
receive a request of the tenant in the multi-tenant model for resource availability of the plurality of host nodes from the controller node; and
respond with an aggregated resource availability across the plurality of host nodes registered to the computer system back to the controller node.

12. The computer system of claim 10, wherein the processor further executes the program instructions to:
request registration with the controller node corresponding to the plurality of host nodes in the container orchestration environment, wherein the computer system controls scheduling and placement of pods on the plurality of host nodes to perform tenant workloads in the multi-tenant model; and
receive confirmation of the registration from the controller node to control the scheduling and placement of pods on the plurality of host nodes to perform tenant workloads.

13. The computer system of claim 10, wherein the processor further executes the program instructions to:
receive a resource availability request of the tenant in the multi-tenant model from the controller node to perform the workload of the tenant;
request pod specifications from the controller node regarding the workload of the tenant to be performed on the plurality of host nodes; and
receive the pod specifications from the controller node regarding the workload of the tenant to be performed on the plurality of host nodes.

14. The computer system of claim 10, wherein the processor further executes the program instructions to:
search the plurality of host nodes for available resources across the plurality of host nodes to perform the workload of the tenant based on pod specifications received from the controller node;
identify the multiple host nodes in the plurality of host nodes that provides efficient utilization of the available resources to perform the workload of the tenant based on the pod specifications and a plurality of factors, wherein the plurality of factors include historic behavior of the tenant regarding resource utilization, service level agreement corresponding to the tenant, and workload type of the tenant; and
place the plurality of pods to run the workload of the tenant across the multiple host nodes providing the efficient utilization of the available resources.

15. A computer program product for creating a multi-tenant model in a container orchestration environment where available host node resources are sharable among tenants, the computer program product comprising a computer-readable storage medium having program instructions embodied therewith, the program instructions executable by a computer to cause the computer to perform a method of:
receiving a request to generate a plurality of pods to run a workload of a tenant in the multi-tenant model from a controller node in the container orchestration environment; and
responsive to receiving the request to generate the plurality of pods, implementing the plurality of pods to run the workload of the tenant using available resources from among multiple host nodes of a plurality of host nodes in the container orchestration environment registered to the computer.

16. The computer program product of claim 15 further comprising:
receiving a registration of the plurality of host nodes corresponding to a plurality of proxied nodes of different tenants in a many-to-many relationship in the multi-tenant model, wherein the computer includes a defined set of application programming interfaces that interacts with the controller node in the container orchestration environment and is one of the plurality of proxied nodes;
receiving a request of the tenant in the multi-tenant model for resource availability of the plurality of host nodes from the controller node; and
responding with an aggregated resource availability across the plurality of host nodes registered to the computer back to the controller node.

17. The computer program product of claim 15 further comprising:
requesting registration with the controller node corresponding to the plurality of host nodes in the container orchestration environment, wherein the computer controls scheduling and placement of pods on the plurality of host nodes to perform tenant workloads in the multi-tenant model; and
receiving confirmation of the registration from the controller node to control the scheduling and placement of pods on the plurality of host nodes to perform tenant workloads.

18. The computer program product of claim 15 further comprising:
receiving a resource availability request of the tenant in the multi-tenant model from the controller node to perform the workload of the tenant;

requesting pod specifications from the controller node regarding the workload of the tenant to be performed on the plurality of host nodes; and receiving the pod specifications from the controller node regarding the workload of the tenant to be performed on the plurality of host nodes.

19. The computer program product of claim 15 further comprising:

searching the plurality of host nodes for available resources across the plurality of host nodes to perform the workload of the tenant based on pod specifications received from the controller node;

identifying the multiple host nodes in the plurality of host nodes that provides efficient utilization of the available resources to perform the workload of the tenant based on the pod specifications and a plurality of factors, wherein the plurality of factors include historic behavior of the tenant regarding resource utilization, service level agreement corresponding to the tenant, and workload type of the tenant; and placing the plurality of pods to run the workload of the tenant across the multiple host nodes providing the efficient utilization of the available resources.

20. The computer program product of claim 15 further comprising:

utilizing a communication proxy of the computer to communicate with the plurality of pods running the workload of the tenant across the multiple host nodes.

\* \* \* \* \*